Dec. 4, 1945.  W. C. GOSS  2,390,067
APPARATUS FOR PREPARATION OF CARBON
Filed Aug. 22, 1942   7 Sheets-Sheet 6

INVENTOR
WORTH C. GOSS
BY
Cook & Robinson
ATTORNEYS

Dec. 4, 1945.  W. C. GOSS  2,390,067
APPARATUS FOR PREPARATION OF CARBON
Filed Aug. 22, 1942  7 Sheets-Sheet 7

Patented Dec. 4, 1945

2,390,067

UNITED STATES PATENT OFFICE 2,390,067

APPARATUS FOR PREPARATION OF CARBON

Worth C. Goss, Seattle, Wash., assignor to William A. Carlisle, Sr., Seattle, Wash.

Application August 22, 1942, Serial No. 455,818

7 Claims. (Cl. 202—110)

This invention relates to apparatus for the preparation of what is commercially known as "primary carbon"; that is, a carbonized material especially prepared for the manufacture therefrom of "activated carbon"; it being understood that "activated carbon" made from the primary carbon, which is the product of the present apparatus, is a granular carbonized material suitable for gas and vapor adsorption, and among its various uses, is quite desirable for the making of gas masks and for other air purifying and air treating apparatus.

More specifically stated, the present invention has to do with a novel apparatus for the expeditious, economical and practical handling, charring and treating of briquettes for the present uses. Furthermore, it concerns the carbonizing of briquettes that have been formed of comminuted wood, and compressed to a size that is most practical for the manufacture of primary carbon therefrom.

It is not here intended to infer that the present apparatus is adapted only to the carbonizing and treating of briquettes made of comminuted wood, but rather, it is to be understood that both the apparatus and the method as here disclosed can be used for the manufacture of primary carbon, either from wood waste briquettes, or from prepared blocks of other substances, or materials, so long as such blocks or briquettes are of a nature adapted to the making of primary carbon therefrom by means not inconsistent with the present disclosure.

It will here be explained that the present method and apparatus is especially suited to the making of primary carbon from briquettes made from ground or comminuted soft woods, such as Douglas fir, and in this connection, it will be mentioned that various patents of the prior art teach that it is especially desirable, if not essential, for producing a satisfactory primary carbon from such material, that the briquettes be subjected to mechanical end pressure, of approximately 200 pounds per square inch of end surface, while being charred in order to reduce as much as possible the existing waste pore space therein. However, this pressure, which for best results, should be quite high at the start of the carbonizing treatment, must be progressively decreased during the charring operation for reasons that will later be apparent. The present invention takes into consideration those well accepted teachings of the prior art in the arrangement of the equipment whereby the method is carried out.

It will also be recalled that heretofore wood briquettes have been used for the manufacture of primary carbon, and that during the charring operation, they have been retained under a high degree of heat, as well as being held under the mechanical end pressure above mentioned. However, the present invention deals more particularly with the method of treating and carbonizing briquettes by the progressive and continuous advancement of a column of briquettes within a tube extended through a heating chamber wherein the carbonizing temperature is progressively increased along the tube for the greater part of its length, and wherein provision is made also for a gradual decrease of the mechanical pressure under which the briquettes are retained as the charring or carbonizing operation progresses.

In view of the foregoing, the principal objects of the present invention are: to provide apparatus for the expeditious, economical and practical manufacture of primary carbon on what would be considered "large scale" production; second, to provide apparatus designed for the automatic and continuous operation, and whereby a continuous charge of material may be progressively advanced through an elongated treating oven or retort, and whereby the briquettes in the continuous charge are maintained throughout the greater part of the treatment, under a gradually increased temperature, and a desired high mechanical pressure that automatically and progressively decreases as the charge is advanced toward the discharge end of the retort; third, to provide a novel and practical apparatus, embodying a battery of units, each unit including a continuous, straight tube that extends horizontally through, from end to end of the heating furnace, with means in the nature of a ram, at one end thereof for charging the tube with the briquettes to be carbonized, or charred, and for the progressive advancement of the charge along the tube, and provided at its discharge or delivery end, with means coacting with the charging ram for maintaining the desired mechanical pressure on the advancing charge and for controlling the discharge of the finished, carbonized material from the tube.

Another object of this invention resides in the provision of a heating furnace equipped with gas burning means for initially bringing it to the desired temperature, and providing other means for subsequently controlling the heat within the furnace, and the variation in temperatures at different locations therealong by the regulated burning of tars, gas and other products released or expelled from the briquetted material incident to its being heated and held under pressure.

Further objects of the invention reside in the relationship of parts, in the mode of operation and details of construction of those parts, designed for the conjoint control of the tube charging and pressure regulating devices located respectively at the receiving and delivery ends of the furnace and briquette containing tube.

Still further objects of the invention reside in the details of construction of the various parts, in their combination, and in their mode of operation, as will hereinafter be fully described.

In accomplishing these and other objects of the invention, I have provided the improved details of construction, the preferred forms of which are illustrated in the accompanying drawings, wherein—

Briefly described, the present apparatus comprises an elongated furnace or retort, within which a battery of horizontally disposed and continuous tubes are located. Each of these tubes extends the full length of the furnace chamber and passes through and beyond the end walls of the furnace. At one end of the furnace, apparatus is provided in accordance with this invention, for charging the tubes with the prepared briquettes and for the progressive advancement of a continuous column of briquettes longitudinally within each tube for treatment. Within the furnace chamber, means is provided for producing heat to the necessary, or to a desired degree, about and within the tubes, to effectively carbonize the briquettes contained therein as the columns of briquettes are progressively advanced.

At the discharge end of the furnace, means is provided in connection with each tube, for resisting the advancement of its contained column of briquettes as required to place the individual briquettes of the column under the desired end pressure during the carbonizing period; the pressure resisting devices for the several tubes being automatically controlled to operate in conjunction with the actions of the hydraulically actuated pistons of the tube charging rams, so that, in predetermined sequence with reference to actions of the corresponding charging rams, these devices will retract to permit the column of briquettes to be advanced and the finished, or completely charred briquettes to be ejected or discharged from the tube.

The briquettes that are to be charred in the present apparatus are of cylindrical, disk-like form, about four inches in diameter and two inches thick. When composed of comminuted wood, they are preferably compressed under approximately 50,000 pounds pressure per square inch of end surface, and for the making of these briquettes, a machine like or similar to that of my copending application filed February 24, 1939, under Serial No. 258,293, might well be employed.

Figure 2:
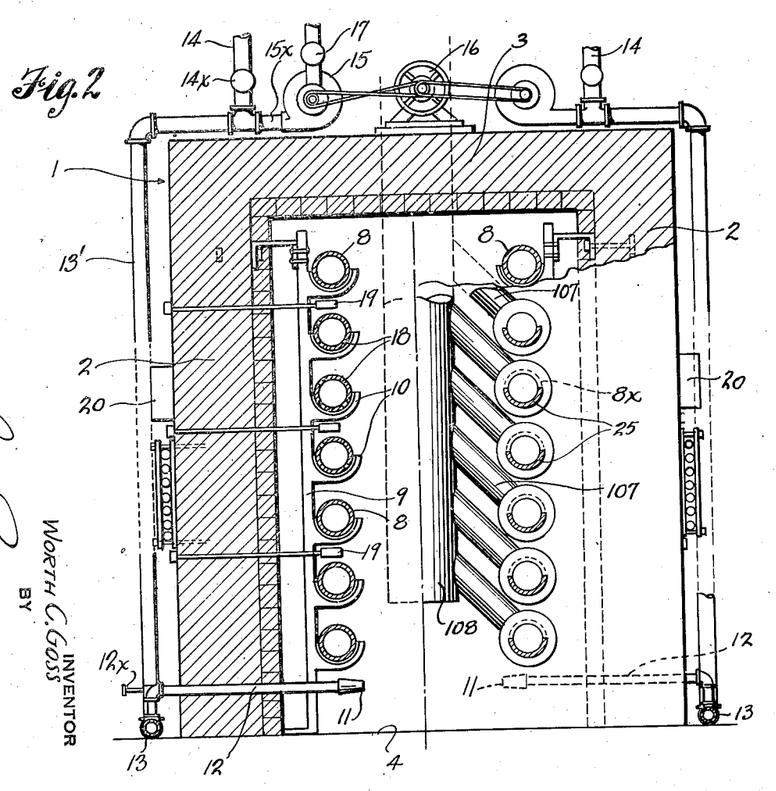
Fig. 2 is a partial end view and partial cross sectional view of the furnace chamber and apparatus; the section being on the line 2—2 in Fig. 1.
Figure 3:
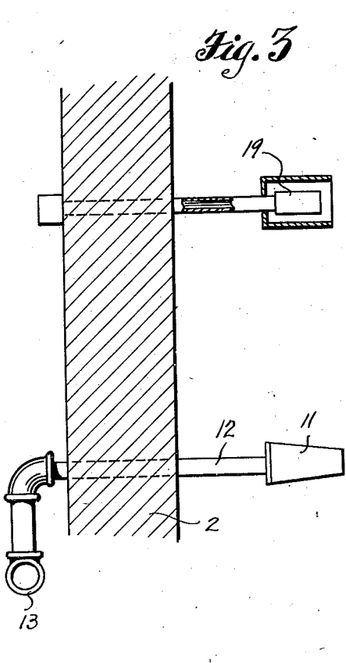
Fig. 3 is an enlarged, sectional detail, through a furnace wall, showing one of the gas burners and a thermocouple as applied to the furnace chamber.

In the present drawings, and especially in Fig. 2, I have shown the furnace chamber designed to accommodate a battery of fourteen charring tubes. However, since all tubes are alike, and since all are equipped with devices of the same kind for charging them with briquettes, for heating, for cooling and for unloading the finished product from the tubes, only one unit, or tube of the two banks illustrated in Fig. 2, will herein be described and illustrated in detail. However, it is to be understood that the description for this particular tube, or unit, will apply equally to all others. This is done mainly to avoid possible confusion and to eliminate a considerable amount of unnecessary drawing and specifications.

Referring more in detail to the drawings—

Figure 1:
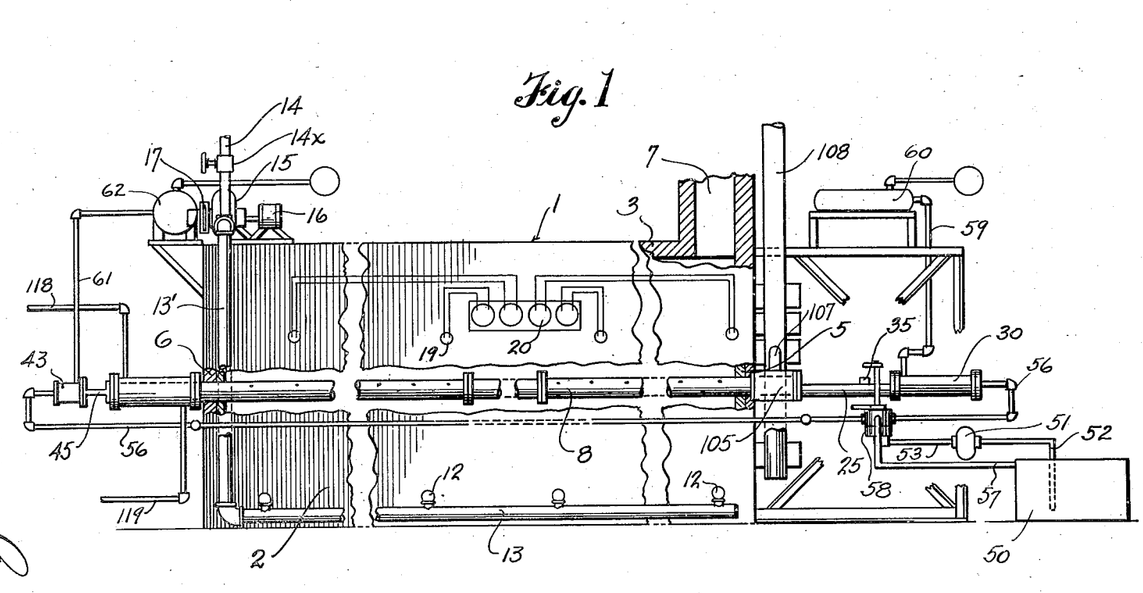
Fig. 1 is a side view of the present briquette carbonizing apparatus; parts thereof being broken away in order to condense the view and to show one of the charring tubes within the furnace.

In Fig. 1, I have shown, in side view, the present preferred arrangement of the furnace and apparatus. In this view, the furnace is designated in its entirety by reference numeral 1, and, as observed in Fig. 2, it is rectangular in cross section, and comprises opposite side walls 2—2, a top wall 3, and a floor or bottom wall 4. Also, as observed in Fig. 1, the furnace is closed at its opposite ends by walls 5 and 6 and is equipped with a stack 7, for the escape of non-burning gases of distillation or for heat control. More stacks might be provided if found desirable.

In view of the high temperatures to be maintained in the furnace chamber, its walls should be constructed of heat retaining materials of proper kind, such as brick, tile or cement, and as herein indicated, the chamber walls should be adequately lined with suitable heat resisting refractories.

A furnace designed in accordance with the present invention, and which is now in operation, has a chamber approximately sixty-three feet long, seven feet high, and four feet wide for the accommodation of fourteen charring tubes. In the present drawings, the charring tubes are designated by numeral 8, and they are arranged in two spaced, vertical banks, as shown in Fig. 2.

Suitable racks, designated by reference numeral 9 are erected vertically within the retort for support of the banks of tubes. These racks are fixed to the side walls of the chamber at spaced intervals therealong, and have brackets 10 extending inwardly therefrom to support the individual tubes. Also, a required number of gas burners 11 are provided in the furnace chamber for initially heating the tubes. These burners, which are located in the furnace chamber near the bottom wall 4, and at spaced intervals along the chamber, have gas and air supply tubes 12 extended thereto through openings provided in the opposite side walls of the retort, and the tubes 12 at each side of the furnace, connect at their outer ends with air and gas supply headers 13; there being several of these headers at each side of the furnace, extending end to end and lengthwise of the retort adjacent the floor line. Gas is supplied to each header from a source of supply 14, and the pressure to each header is maintained by use of a suitable blower 15, driven by an electric motor 16. As herein shown, there are four blowers employed, each to supply gas and air to a definite part of the furnace chamber. Each blower housing has its inlet side adapted to be supplied with outside air, entering under control of an adjustable valve mechanism, as at 17. The outlet of each blower, 15x, is connected to a pipe line 13' leading to tthe corresponding header 13 Provision is made also, by the incorporation of a control valve 14x in the gas line connection with each of the lines 13', to cut off supply of gas to the headers 13, as desired, or to produce a desired air and gas mixture.

It will further be explained that, after the furnace chamber and tubes 8 therein have been brought up to the desired initial temperature by heat derived from the various gas burners, it is the intention that products which result from the destructive distillation of briquettes in the tubes shall be used as fuel whereby to continue and maintain the carbonizing heat. Therefore, the several tubes 8 are provided at spaced intervals along their length with small perforations 18 for the escape of gases, tars, etc., and it is apparent that these escaping products of distillation will burn with considerable heat as they issue from the tube perforations. In fact, heat thus derived from the briquettes, has proven to be more than adequate for maintaining the operation. After gas supplied from the source 14 has been shut off, the temperature in the furnace chamber may be determined and controlled by the amount of air admitted to the chamber. In this instance, it is accomplished by the setting of the air control dampers 17 of the blowers 15.

Since it is desirable in the carbonizing of the briquettes as advanced in the tubes, that they be subjected to various heats as they progress through the furnace chamber, it is significant then that provision is made to control air admission, for, through its controlled admittance, the rate of combustion may be made faster or slower, and the heat increased or decreased accordingly. In this way, at least four different heat sections are established in the furnace chamber.

At intervals along the furnace, suitable thermocouples 19 are inserted through the side walls for use in indicating the temperature at those particular locations. These thermocouples are electrically connected, in accordance with the method and means known in this art, with temperature indicating and recording instruments designated at 20, preferably mounted at a central location of the furnace and on a side wall thereof, as observed in Fig. 1, for convenience of the operator in observing the temperature at different locations along the furnace chamber.

Also, thermostatic means is provided at each of the four heat sections in the furnace for control of the blowers so that they furnish air in proper amount to maintain the desired degrees of heat at each of the four sections.

In a furnace of this particular kind, and for the particular operation at hand, the furnace chamber is approximately sixty-three feet long, and it has been found most practical that the temperature within the charring tubes 8, adjacent the receiving end of the furnace, should be approximately 900° F., and adjacent the discharge end of the furnace, should be approximately 1200° F., and that the change in temperature should be gradually stepped up from the receiving to the discharge end. The regulation of temperature, as has been explained, is effected through the controlled burning of the products of distillation, and this control is effected by the controlled admittance of air at various locations along the retort; the more air admitted at any particular location, the more complete will be combustion and the greater the degree of heat produced at that location.

It will be further explained that in the carbonizing of briquettes made from comminuted wood of the character of Douglas fir, they should be approximately one inch less in diameter than the diameter of tubes 8 through which they are to be advanced to insure plenty of clearance regardless of expansion incident to treatment. This would apply also to most other materials. The tubes which are provided in this particular apparatus are approximately five inches in diameter to receive briquettes that are approximately four inches in diameter. Thus, adequate clearance is provided about the columns of briquettes therein, to insure them against any possibility of their jamming within or clogging the tubes during the carbonizing process.

The briquettes to be carbonized, herein designated by reference numeral 22, when placed in the tube for treatment, are assembled in end to end relationship, with a flat metal disk, or plate 23, inserted flatwise between adjacent briquettes. These metal disks are of the same diameter as the briquettes, and about one-half inch thick and serve two purposes: first, to keep the adjacent briquettes from uniting under the heat and mechanical pressure that is applied thereto, and second, to conduct heat from the tube walls to the center of the column of briquettes as advanced through the tube.

Each of the charring tubes might be one continuous tube, or, as here shown, might be made up of a plurality of flanged sections joined end to end. However, with the understanding that the various charring tubes 8 are extended horizontally from end to end of the furnace, and that the means herein disclosed is adequate for the necessary heating of the furnace chamber and the maintenance of the desired gradient of increasing temperatures therealong, the operation of the apparatus would be as follows:

First, briquettes 22, alternating with the metal spacing disks 23, are placed end to end to form short loads, and these loads are inserted endwise into the receiving end of a charring tube 8. A continuous column of briquettes within the charring tube is thus built up by repeated loadings, and is progressively advanced within the tube toward the discharge end thereof.

Figure 13:
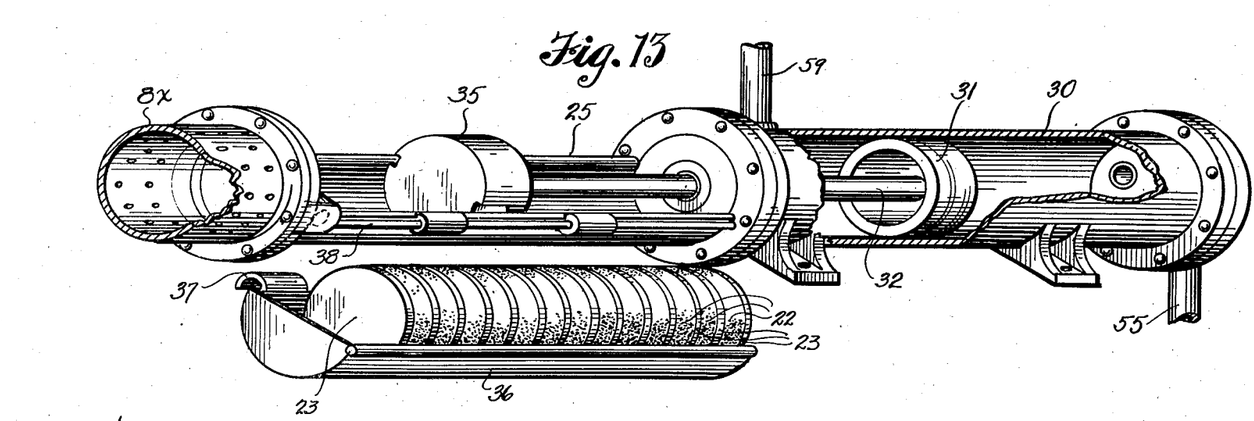
Fig. 13 is a perspective view of the tube loading ram and tube charging trough; the ram cylinder having a portion thereof broken away for better illustration of enclosed parts.
Figure 14:
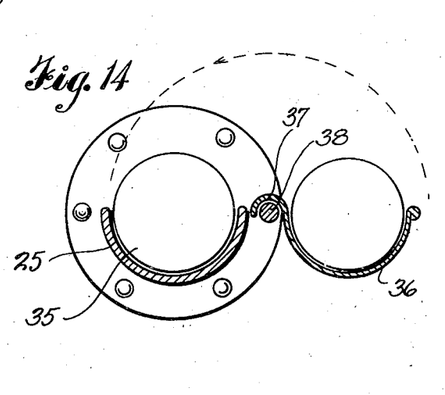
Fig. 14 is a cross section of the charging trough and load dumper.

To facilitate the above method of charging the tubes 8, I have equipped each with a loading trough 25. The trough, as noted in Figs. 13 and 14, is of semi-cylindrical form, and is of the same cylindrical curvature as the tube 8 to be charged. The trough is flanged at its ends, and is fixed solidly, at one end, by means of the end flange, to the tube end so that these parts are coaxially alined.

Fixed to the outer end flange of the loading trough is the tube charging and column advancing ram. This comprises a hydraulic cylinder 30 that is fixed rigidly to and in coaxial alinement with the trough and tube to be charged. Within the cylinder is a piston 31, and a rod 32 extends therefrom and from the ram cylinder into the trough, and is provided at its end with a pad 35.

Figure 4:
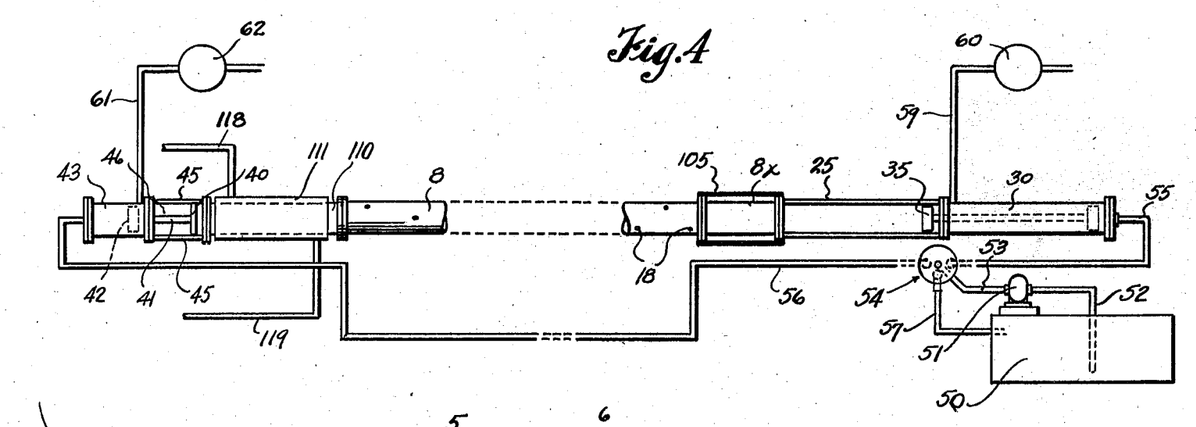
Fig. 4 is a view diagrammatically illustrating the devices of the control system for the synchronized operation of the tube charging ram and the pressure sustaining abutment, located respectively at the receiving and discharge ends of one of the charring tubes.

Assuming that the piston is in what may be considered its retracted position; that is, moved to its outer limit in its cylinder 30, as seen in Fig. 4, the pad 35 will then assume a position at the outer end of the loading trough. With the pad so disposed, a short load made up of briquettes 22, alternating with the metal spacing disks 23, may be manually laid in the loading trough. Then, upon advancement of the piston of the loading ram, the pad 35 at the end of the piston rod 32, will engage the outer end of this assembled load of briquettes and push it endwise into the tube 8. Repeated operations of retracting the ram, placing loads in the trough, and advancing the ram to push the load into the tube, will finally result in filling the tube 8 from end to end, and continued loading will progressively advance the charge and ultimately result in the discharge of material from the delivery end of the tube, as controlled by the pressure resisting means presently described.

To aid in placing the loads of briquettes and spacing disks in the trough, I provide a load holder 36, as shown in Figs. 13 and 14. The briquette loads are formed in the holder 36, which is of semi-cylindrical form. This holder, adjacent its ends and at one side, has hooks 37 adapted to be supportingly and pivotally applied to a rod 38 that is fixed to and extends along one side of the trough 28, as in Fig. 13; after the hooks have thus been applied, it is possible, by swinging the loader about the pivot rod to an inverted position, to deposit the briquette load in the trough, and in position for its endwise advancement into the tube 8 upon the forward action of the ram.

Since the tube 8 is of considerable length, it will be understood that there will be an appreciable amount of friction to overcome with each intermittent advancement of the briquette column therein. The greater part of this friction results from the metal spacing disks which are in contact with the metal of the tubes, and when these parts are red hot, the two have a great tendency to stick together. To overcome this tendency to stick, and to insure uniformity of pressure required for the successive operations for advancement of a charge through the tube, I apply a lubricant, preferably powdered graphite, in predetermined amounts, to the loading trough just prior to the placing of the charges of briquettes therein. This lubricant has proven to be necessary and to very effectively overcome all frictional difficulties otherwise encountered. Furthermore, it will be understood that, as determined by the rate of charging, it will require an appreciable length of time for any designated briquette in the column to pass from end to end of the charring tube. It is intended that the rate of charging shall be such as to allow all briquettes to be completely charred. In the present instance, where the charring tube is approximately sixty-three feet long, the charring period is approximately ninety minutes.

In order that the briquettes, while being advanced, may be subjected to the desired mechanical pressure of 200 to approximately 250 pounds per square inch of end surface, I provide a tube closure means, or abutment 40 at the discharge end of the tube 8 against which the finished end of the advancing column of briquettes engages, and whereby the column is held, as charging pressure of the ram is applied to the column at the intake end of the tube. This abutment, with each second advancement of the column by the loading ram, is retracted to permit the advancement of the column and the discharge or ejection of finished products from the tube. The stroke of the charging ram is approximately forty inches, but since the briquettes, under the heat treatment given them, shrink or are compressed to slightly more than half their original thickness, it is thus only required that this pressure resisting abutment be retracted every second stroke of the charging ram, and then only to an extent necessary to allow the charred briquettes and spacer disks to drop out from the tube end.

Figure 16:
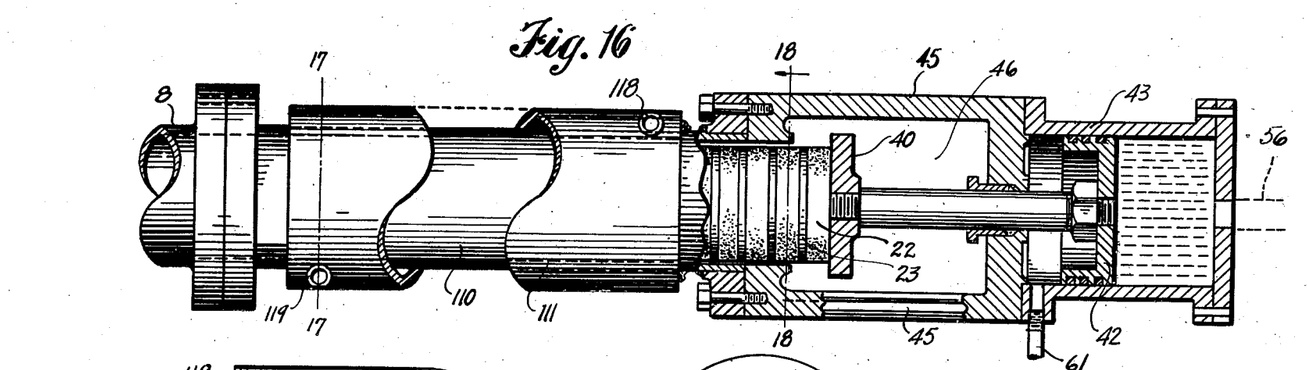
Fig. 16 is an enlarged, top or plan view, partly in section, of the pressure retaining and unloading ram and the adjacent cooled end section of the briquette charring tube.
Figures 17, 18, 19:
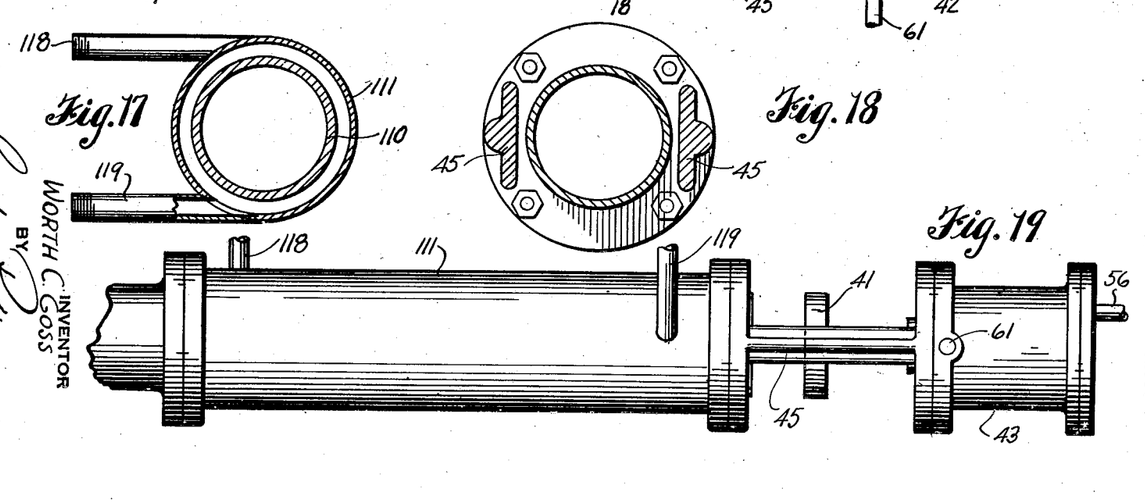
Fig. 17 is a cross section on line 17—17 in Fig. 16.
Fig. 18 is a cross section on line 18—18 in Fig. 16.
Fig. 19 is a side view of the parts which are illustrated in Fig. 16.

By referring now more particularly to Fig. 16, it will be observed that the pressure retaining abutment 40 at the discharge end of the tube 8 is in the form of a disk-like pad, fixed on the end of a piston rod 41 which extends from a piston 42 reciprocally fitted in a hydraulic cylinder 43. The cylinder 43 is supported from and is coaxially alined with the discharge end of the tube 8, by a pair of attaching bars 45 and 46, spaced to leave an open space 46 between them sufficient for the carbonized product and disks 23 to drop from the tube when the abutment is retracted.

The feeding ram 30 associated with the tube charging apparatus, and the hydraulic cylinder 43 of the unloading device, are under the joint control of a hydraulic-pneumatic control system. As shown diagrammatically in Fig. 4, the system comprises a source of supply 50 of a hydraulic pressure medium, such as oil, and a mechanically driven pump 51 operates to draw oil from the supply through a pipe 52 and to deliver it through a pipe 53, at a definite pressure to a special control valve, designated in its entirety in Fig. 4 by reference numeral 54, which controls its application.

The valve 54 has pipes 55 and 56 leading therefrom, respectively, to the outer ends of the hydraulic cylinders 30 and 43. These tubes for the several carbonizing units are shown in banks at opposite sides of the furnace in Fig. 2. Also, there is a relief, or return pipe connection 57, from the valve to the supply tank 50. Application of the hydraulic pressure medium to the outer ends of the cylinders 30 and 43, to move their respective pistons toward the adjacent ends of the tube 8, is under control of a manually adjusted, rotary valve plug 58 fitted in the valve housing, as presently to be described. The outward movement of the pistons of the two hydraulic cylinders is effected, not through or by the hydraulic pressure medium, but by air under pressure, supplied to the inner ends of the cylinders. In Fig. 4, it is shown that the cylinder 30 has a pipe connection 59 leading to its inner end, from a constant supply of air under pressure, designated at 60, and, likewise, cylinder 43 has a pipe connection 61 with a supply of air under pressure, designated at 62; the latter being at higher pressure than the former.

It will be explained here that air at both sources 60 and 62 is lower in pressure than the hydraulic pressure provided by pump 51. Thus, the air pressure operates to move the pistons outwardly only when the resisting hydraulic pressure is below that of the air.

Figure 11:
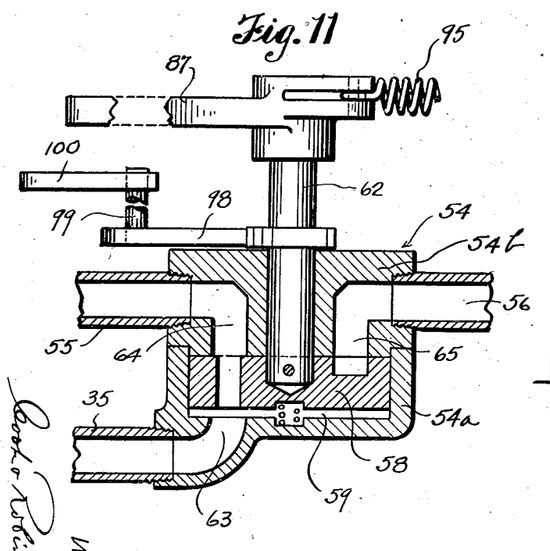
Fig. 11 is an enlarged plan view of the control valve for the hydraulic system of Fig. 4.
Figure 12:
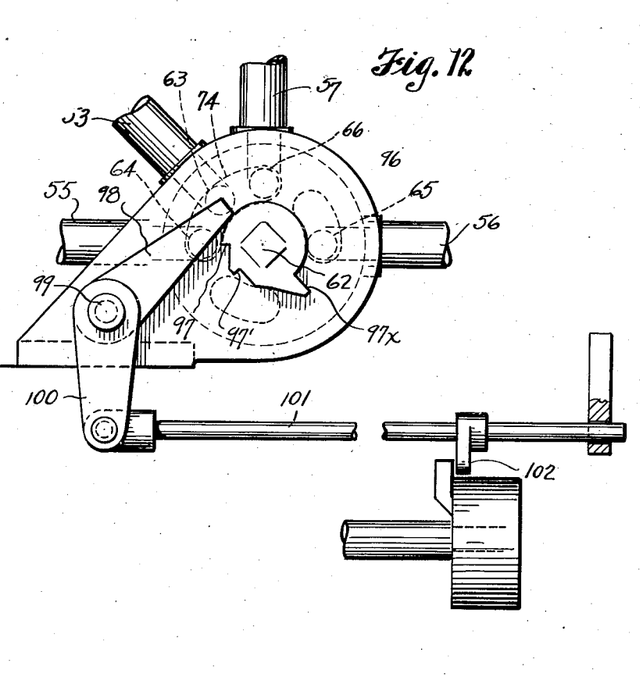
Fig. 12 is a cross sectional detail of the valve, taken on the line 12—12 in Fig. 11.

The detailed construction of the valve 54 is shown in Figs. 11 and 12 wherein the valve housing is shown as being of two-part construction, comprising a cylindrically formed lower portion 54a revolubly containing the rotary valve member 58 therein, and a top portion 54b that is fixed to the part 54a as a closure for the valve chamber.

The rotary valve member 58 is of disk-like character and is of lesser thickness vertically than the depth of the valve cylinder so that, as assembled with the chamber, it provides a pressure chamber 59 beneath its entire lower surface. Fixed in the valve disk, centrally thereof, is an upwardly extending shaft 62 by which the disk is rotatably adjusted for control of the system. Formed in the lower section of the valve housing, is an inlet port 63 opening into chamber 59, to which port 63, the pressure line 53 from pump 51 connects. Thus, the pump furnishes hydraulic pressure medium at all times to the entire under surface of the valve disk. Formed in the upper section of the valve housing, are outlets 65 and 65, at diametrically opposed points, to which the pipe lines 55 and 56, respectively, connect, and at an intermediate location is a return outlet 66 to which the pipe 57 connects. These openings 64, 65 and 66 open through the housing, downwardly to the top of the valve disk, and all are at equal distances from the axis of the valve disk.

The valve disk 58 is formed in its top surface with an arcuate channel 74 extending through an arc of approximately 90°. Formed directly through the disk are arcuate ports 75 and 76, each extending through an arc of approximately 45° and together spanning an arc of approximately 180°; it being noted by reference to Fig. 13 that the ports 75 and 76 are symmetrically located in one half of the disk and the channel 74 is in the other half.

Figure 7:
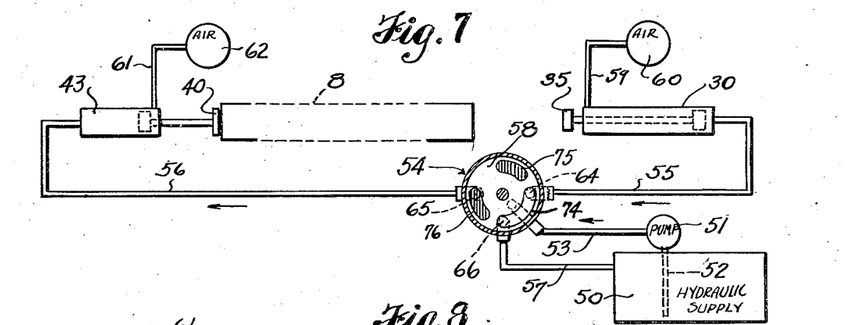
Figs. 7, 8, 9 and 10 each diagrammatically illustrate the piping connections of the hydraulic system that controls the tube charging ram at the receiving end of the charring tube, and the pressure holding ram at the discharge end thereof; and together illustrating the different positions of adjustment of the control valve for effecting the successive operations of the apparatus.

Assuming the piping connections to be as shown diagrammatically in Fig. 4, or in the diagrammatic views 7, 8, 9 and 10, the control of the apparatus for the loading and discharging of material by manipulation of the valve 54, is as follows:

Assuming Fig. 4 to show the parts at a starting position, with the charging ram 35 retracted and the pressure resisting pad 40 in position closed against the discharge end of the tube 8, the valve disk 58 then assumes the position indicated in Fig. 7, at which the hydraulic pressure medium is being admitted through port 76 directly into pipe line 56, while line 55 is connected through valve channel 74 to discharge line 57. This releases hydraulic pressure from cylinder 30 and allows air pressure from source 60 to move the charging ram to its retracted position, thus allowing the trough 25 to be loaded with briquettes.

Figure 8:
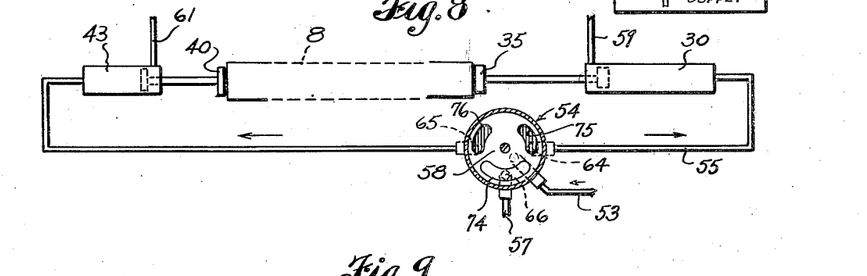
Figure 9:
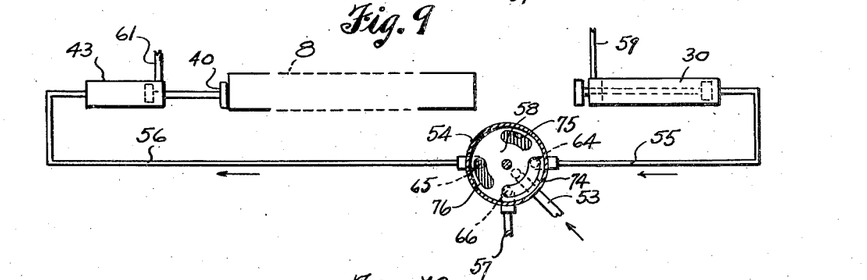

After a load of briquettes, spaced by the disks 23, has been placed in the loading trough, the valve 58 is then rotated to position of Fig. 8, at which hydraulic pressure is applied through valve passages 75 and 76 directly to the pipe lines 55 and 56. This pressure retains the abutment 40 closed against the tube 8 and causes the loading ram to be advanced, to move the load of material in the trough into the tube 8. Then the abutment 40 is still retained in holding position, while the loading ram is again retracted; this being accomplished by adjustment of the valve disk 58 to the position shown in Fig. 9, wherein it is seen that the valve port 76 is registered with the outlet connection 65 to pipe 56 while the channel 74 provides a return connection between ports 64 and 66 for return flow of medium from the outer end of the loading cylinder to the exhaust pipe 57. With this setting of the valve, air pressure from source 60 moves the ram outwardly.

Figure 10:
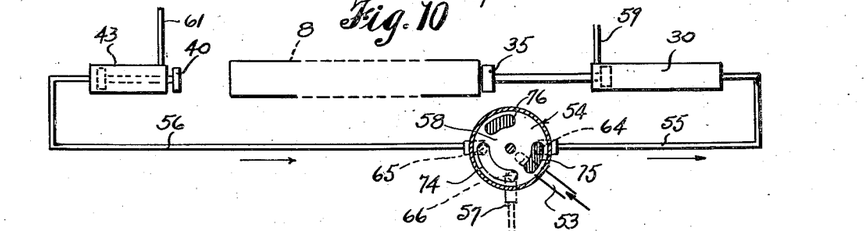

Then, with another load placed in the loading trough, the valve 58 is again rotated, to position of Fig. 10, to place the port 75 in registration with pipe connection 55 and the channel 74 in communication with the housing exhaust port 66 and the connection with pipe line 56, to allow retraction of the holding abutment, by air pressure from source 62, while the feeding ram is advanced, to push the load from trough 25 into the tube 8. This advance, or feeding action of the loading ram, causes the continuous column of briquettes and their metal spacing disks, to be advanced in the tube and a certain length thereof to be ejected from the delivery end of the tube. As soon as this discharge stroke of the ram has been completed, the cycle, as above described, is repeated.

Operation of the control valve 58 may be manually effected, and for this purpose the shaft 62 is provided with an operating handle 87 at its upper end. It has been found desirable, however, that means be provided to automatically trip the valve by the action of the loading ram; this action to take place when the ram reaches the full travel of its loading stroke. The tripping of the valve causes the rotary disk 58 to be moved from a set position, as of Figs. 8 or 10, back to the position of Fig. 7 or 9.

To accomplish this tripping action, a coiled spring 95 is attached to the hand lever 87 under tention, as in Fig. 13, and this operates to rotate the valve disk in a counter-clockwise direction. Fixed on the shaft 62 is a ratchet 96 with stops 97—97' and 97x. A pawl 98 is fixed on a shaft 99 that is pivotally mounted in the valve supporting bracket. The pawl is arranged to engage with the ratchet. Fixed on the shaft 99 is a lever arm 100, and to this, a rod 101 is fastened, as seen in Fig. 12, and extended forwardly along the feed trough 25, and slidable through a supporting guide 103, and near the guided end is equipped with an inwardly directed lug 102.

When the loading ram reaches its full stroke, the pad 35 engages the stop 102 and shifts rod 101 to cause pawl 98 to disengage the ratchet, thus to permit the spring 95 to rotate the valve member 58 back until stop 97x engages a limiting stop 104 on the valve housing, thereby to position the valve to effect the retraction of the ram.

Advance movements of the ram 35 are effected by the manual setting of the valve by the hand lever 87 whereby the ratchet is rotated to cause the pawl to engage either the stop 97, or 97', to set the valve in position of Fig. 8 or Fig. 10.

Figure 5:
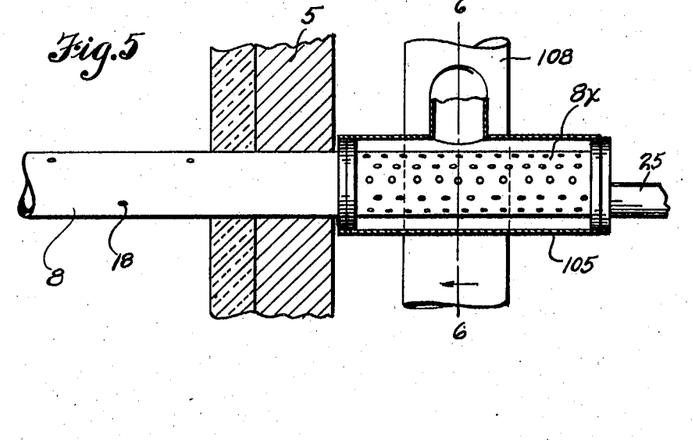
Fig. 5 is an enlarged, sectional detail at the receiving end of the furnace, showing the end wall and the relative position of the perforated end section of the charring tube designed for the withdrawal of smoke and gas that are incident to the application of heat to briquettes entering the charring tube.
Figure 6:
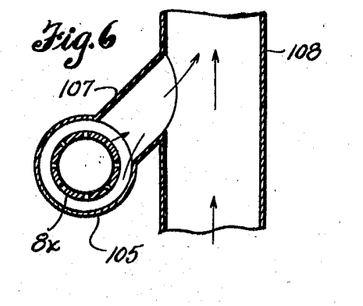
Fig. 6 is a cross section on line 6—6 in Fig. 5.

In view of the fact that as the briquettes are initially loaded or advanced into the receiving end of the charring tubes 8, the high heat to which they are subjected will cause a rapid discharge of smoke and gas therefrom, I have provided each tube, at its receiving end, with a short, perforated section, which in Figs. 5, 6 and 13, has been designated by numeral 8x. This particular section is just outside of the main end wall of the furnace, but is housed within a shell 105 which has a pipe connection 107 to a stack 108 for escape of gas and smoke, thus produced. To this stack, a suction fan may be attached to create the necessary draft to insure that all smoke or gas will be withdrawn and not allowed to flow from the receiving end of tube 8.

At the discharge end of the tube 8, there is also a section of tube 110 extended somewhat beyond the furnace end wall 6, and this section is water jacketed, as at 111 in Fig. 16, and cold water is supplied thereto from a pipe 118, and is drained off by a pipe 119. This circulation of water facilitates the cooling of the carbonized briquettes and spacer plates just prior to their discharge from the machine.

Figure 15:
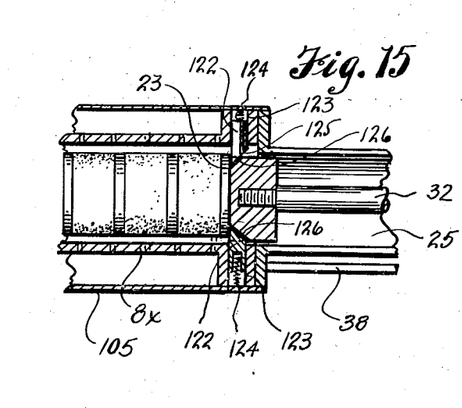
Fig. 15 is a detail, showing the column holding dogs associated with the receiving end of the charging ram.

In order that the loads, as forced into the tube by the charging ram, may not be permitted to expand endwise as the loading ram is retracted, I provide, at the receiving end of the tube 8x, a pair of diametrically disposed latch bolts 122, as noted in Fig. 15, which are slidable in guides 123 and are urged inwardly by springs 124. These bolts have beveled inner end surfaces adapted to be engaged by entering loads, to push them outwardly, but the bolts will snap into holding contact with the end disk 23 of the entering load as it is forced into place. The ram head 35 is provided in its opposite sides with recesses 126 to accommodate the latches, as will be noted in Figs. 13 and 15.

As a result of the present method of charging the tubes 8, and in view of the extreme length of the tubes 8, the pressure per square inch of end surface against the briquettes in advancing the column will be approximately fifty pounds per square inch more at the charging end of the tube than at the discharge end. Then, with the disclosed provision for periodic release and discharge of material with each alternate charging stroke, it is possible to bring about a desired maximum high pressure of approximately 250 pounds per square inch of end surface on each briquette at the receiving end of the tube, which will automatically decrease to 200 pounds per square inch at the discharge end. This decrease is desirable, since as the briquettes become charred and the heat is increased, they become more brittle, and would have a tendency to crush at the high pressure of 250 pounds per square inch, but do not crush under the decreased gradient that automatically results with the approach of the individual briquettes toward the discharge end of the tube.

With this apparatus the charges of material may be continuously and progressively advanced through the retort, and thus a great saving of time and expense is accomplished over that which would be required if the tubes were first completely charged, then unloaded. Furthermore, the arrangement of apparatus and particular mode of operation, results in a simple and practical commercial operation for the production of primary carbon.

Having thus described my invention, what I claim as new therein and desire to secure by Letters Patent is:

1. A briquette carbonizing means comprising a furnace chamber, a carbonizing tube extended through the chamber, means for heating the tube within the chamber for the carbonization of briquettes therein, a pressure charging means at one end of the tube whereby briquettes may be loaded into the tube and the charge progressively advanced under pressure along the tube as a continuous column and an abutment means at the discharge end of the tube normally resisting the advancement of the column by the pressure means for the compression of the briquettes in the column, and means for periodically retracting the abutment for the discharge of briquettes from the tube under influence of the pressure means.

2. A briquette carbonizing means comprising a furnace, a carbonizing tube extended through the furnace for heating thereby and for the carbonization of briquettes in the tube, a ram at one end of the tube operable for the loading of charges of briquettes into the tube at that end and to progressively advance them as a continuous column along the tube, an abutment at the discharge end of the tube adapted to resist advancement of the column to effect carbonization of the briquettes under compression, and means for the periodic retraction of the abutment for discharge of carbonized briquettes from that end of the tube.

3. A briquette carbonizing means comprising a furnace, a continuous tube extended horizontally through the furnace for the carbonization of briquettes therein, a ram mounted at one end of the tube and reciprocally operable for the loading of charges of briquettes into the tube and for their advancement within the tube as a continuous column, a hydraulic ram at the discharge end of the tube comprising a piston and rod with an abutment at the end of the rod normally resisting advancement of the briquette column and means for causing the abutment to retract periodically in timing with advancement of the column by the loading ram.

4. A briquette carbonizing means comprising a furnace, an elongated carbonizing tube extended horizontally therethrough and with its opposite end portions projecting from the furnace, a loading trough mounted on the tube at one end for the reception of briquettes for loading into the tube, a hydraulic cylinder mounted by the trough at its outer end, and having a piston and rod with a pad on the rod to engage the loads of briquettes in the trough to advance them into the tube as a continuous column, for carbonization therein, and means at the discharge end of the tube for resisting the advancement of the column of briquettes whereby to place them under compression through the action of the loading means.

5. A briquette carbonizing means comprising a furnace, an elongated carbonizing tube extended horizontally therethrough and having its opposite end portions projecting from the furnace, a loading trough mounted on the tube at one end as a continuation thereof and adapted for reception of briquettes in end to end relationship for advancement into the tube, a hydraulic ram mounted on the outer end of the trough and reciprocally operable to advance loads of briquettes from the trough into the tube as a continuous column that will be progressively advanced in the charring tube, a hydraulic ram mounted in the tube at its discharge end and adapted to engage the briquette column to resist its advancement, and means operable to control the action of the loading ram and the last mentioned ram whereby the latter will be periodically retracted in timing with advance movements of the loading ram, for the unloading of charred briquettes.

6. A briquette carbonizing means comprising a furnace, an elongated carbonizing tube extended through the furnace and having its opposite end portions projecting from the furnace, a reciprocable charging means at one end of the tube whereby charges of briquettes may be moved into the tube at that end and the charges progressively advanced under pressure as a continuous column, means at the discharge end of the tube normally resisting advancement of the column to place the briquettes under endwise pressure, and latch means at the receiving end of the tube for engaging the column end to sustain the back pressure when the charging means retracts.

7. A briquette carbonizing means comprising a furnace, an elongated tube extended through the furnace and having two opposite end portions projecting from the furnace for the reception and discharge of the briquettes, means for loading charges of briquettes into the tube at one end and for advancing them progressively through the tube under pressure; said tube having a part thereof that projects from the furnace at its receiving end perforated for the escape of smoke and noncombustible gases, and having perforations therein within the furnace for the escape of combustible gases into the furnace for burning.

WORTH C. GOSS.